United States Patent [19]
Desrus

[11] Patent Number: 5,283,741
[45] Date of Patent: Feb. 1, 1994

[54] CONTROL APPARATUS FOR A VEHICLE POWER STEERING SYSTEM

[75] Inventor: Dany Desrus, Paris, France

[73] Assignee: Valeo Electronique, Voisins-Le-Bretonneux, France

[21] Appl. No.: 711,872

[22] Filed: Jun. 7, 1991

[30] Foreign Application Priority Data

Jun. 8, 1990 [FR] France ............................. 90 07130

[51] Int. Cl.$^5$ ............................................. B62D 6/04
[52] U.S. Cl. ............................ 364/424.05; 180/143; 180/141
[58] Field of Search ............ 364/424.05, 424.01, 364/559, 565, 566; 180/140, 141, 142, 79.1; 33/1 PT

[56] References Cited

U.S. PATENT DOCUMENTS

| | | | |
|---|---|---|---|
| 4,666,013 | 5/1987 | Shibahata et al. | 180/141 |
| 4,720,791 | 1/1988 | Daido | 364/424.05 |
| 4,794,536 | 12/1988 | Eto et al. | 364/424.05 |
| 4,878,557 | 11/1989 | Shibahata et al. | 180/140 |
| 4,992,944 | 12/1991 | Noto et al. | 364/424.05 |
| 4,996,657 | 2/1991 | Shiraishi et al. | 364/559 |
| 5,065,324 | 11/1991 | Oshita et al. | 364/424.05 |
| 5,119,302 | 6/1992 | Abe et al. | 364/424.05 |
| 5,136,507 | 8/1992 | Shiraishi et al. | 364/424.05 |

FOREIGN PATENT DOCUMENTS

| | | |
|---|---|---|
| 0190678 | 8/1986 | European Pat. Off. . |
| 0233012 | 8/1987 | . |
| 2659437 | 7/1978 | Fed. Rep. of Germany . |
| 2758308 | 7/1979 | Fed. Rep. of Germany . |
| 9007130 | 2/1991 | France . |
| 2175551 | 12/1986 | United Kingdom . |
| 2188296 | 9/1987 | United Kingdom . |

Primary Examiner—Thomas G. Black
Attorney, Agent, or Firm—Dennison, Meserole, Pollack & Scheiner

[57] ABSTRACT

In the control apparatus of the invention, the power steering can be activated or deactivated by at least one control signal. The invention is characterized in that the control apparatus includes a member for measuring at least one parameter for activation of the power steering system as well as a member for measuring at least one parameter for deactivation of the power steering system. The control apparatus also includes a member for performing a first test to detect whether at least one activation parameter meets an activation condition, and a member for activating the power steering in response to the first test. Additionally, the control apparatus utilizes a member for performing a second test to detect whether at least one deactivation parameter meets a deactivation condition, and a member for deactivation of the power steering in response to the second test.

15 Claims, 4 Drawing Sheets

CONTROL APPARATUS FOR A VEHICLE POWER STEERING SYSTEM

BACKGROUND OF THE INVENTION

The invention relates to a control apparatus of a power steering system for a motor vehicle.

In the prior art, systems have already been proposed that enable control or power assistance of the rotation of steerable wheels in response to effort by the driver exerted on the steering wheel mounted on the steering column.

Until now, the power assist has most often been controlled by detecting the torque exerted on the steering column by the driver.

In particular, assemblies that enable measurement of the torque exerted have been proposed.

Such systems require that the steering column include either dual shafts, or a torsion shaft at one point, the difference in rotational angles between the two parts of the steering column being a measure of the torque exerted.

Such systems increase the price of power steering considerably and prevent these provisions from being adopted for vehicles at the low end of the price range.

SUMMARY OF THE INVENTION

Furthermore, in many steering situations the torque measurement at the steering wheel is a superfluous parameter.

The present invention overcomes these disadvantages of the prior art, in particular by proposing a control apparatus for a power steering system for at least one pair of vehicle wheels, wherein the power steering can be activated or deactivated by a first control signal, characterized in that the control apparatus includes:
- a means for measuring at least one parameter for activation of the power steering system and a means for measuring at least one parameter for deactivation of the power steering system;
- a means for performing a first test to detect whether at least one activation parameter meets an activation condition;
- a means for activating the power steering in response to the first test;
- a means for performing a second test to detect whether at least one deactivation parameter meets a deactivation condition; and
- a means for deactivation of the power steering in response to the second test.

BRIEF DESCRIPTION OF THE DRAWINGS

Further characteristics and advantages of the present invention will be better understood from the ensuing detailed description and the accompanying drawings, which are.

DESCRIPTION OF THE INVENTION

Figure 1:
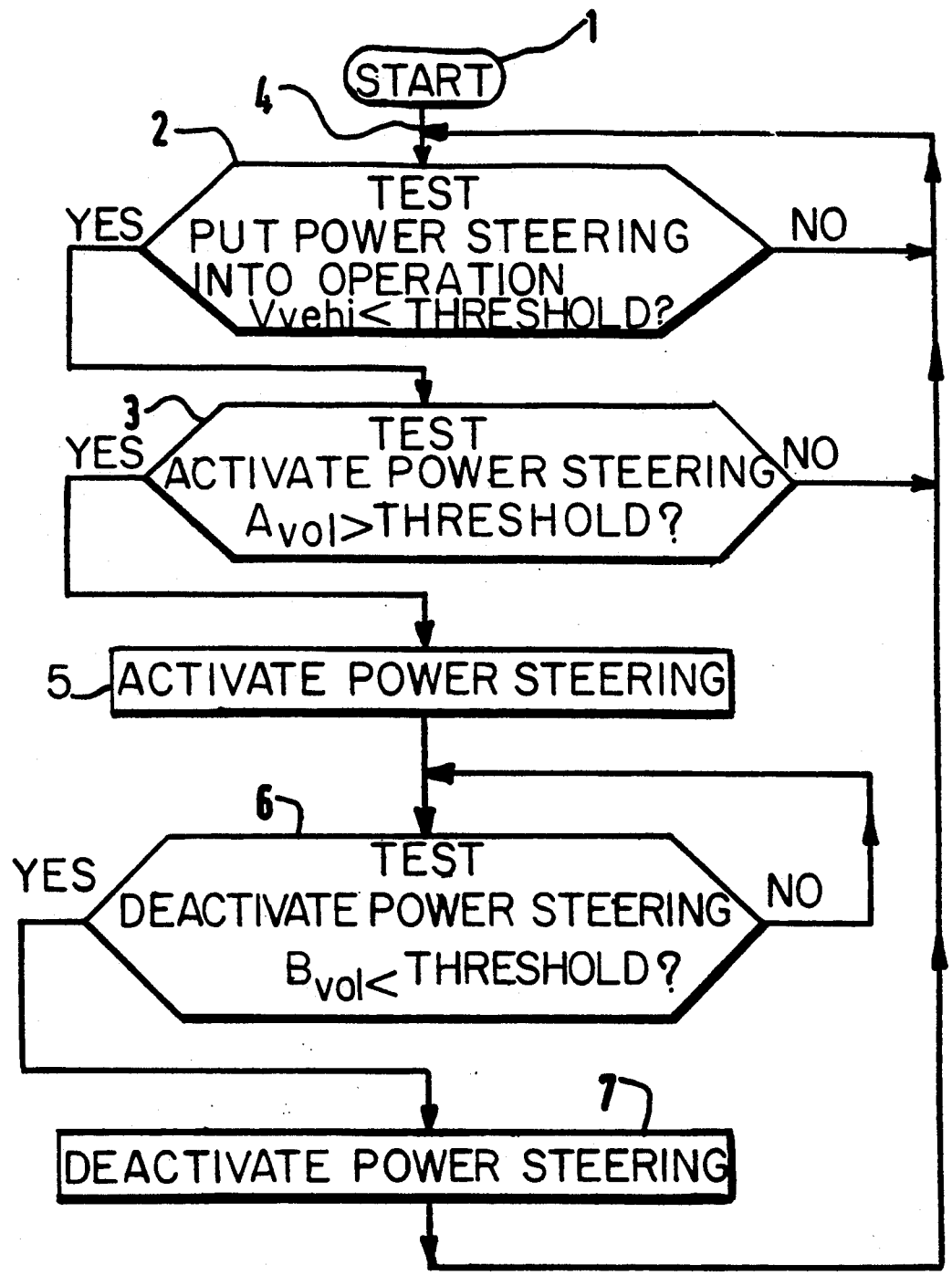
FIG. 1: a flow chart for a strategy for pilot control of a control apparatus according to the invention.

In FIG. 1, a flow chart is shown illustrating in a preferred embodiment the pilot control strategy of the control apparatus according to the invention.

The flow chart begins with an initialization phase, during which the vehicle is in some arbitrary state: in motion or at a stop. The steerable wheels are the front wheels.

In a preliminary test step 2, a condition of putting the power steering into operation is tested. This step makes it possible in particular to employ the system for power steering of the front wheels in several predetermined circumstances.

In a preferred exemplary embodiment, this condition for putting into operation is attained when the apparatus of the invention has determined that the driver of the vehicle has put it into the parking mode.

In a preferred embodiment of the invention, the test for this condition of putting into operation is performed by measuring the speed of the vehicle and detecting whether this speed is less than a threshold.

In a preferred exemplary embodiment, the speed threshold of the vehicle is fixed at 10 km/hr.

If the test is not positive, a return to the waiting point 4 is made.

The apparatus of the invention monitors this condition continuously.

As soon as the aforementioned condition is reached, a shift to a first test 3 is made, in which a condition of activating the power steering system is tested, in accordance with whether the rotational speed of the steering wheel is exceeding a predetermined first threshold.

If this condition is not met, a return to the waiting point 4 is made. If condition 3 is attained, the control apparatus of the invention actuates the power steering system, in step 5.

Then, in step 6, a second test, intended to deactivate the power steering system, is performed. In the preferred embodiment, the deactivation is appropriate if the rotational speed of the steering wheel is decreasing more rapidly than a predetermined threshold.

When this condition is met, the control apparatus detects whether the driver has exerted a force calling for the end of the power steering, and in step 7 an operation of deactivating the power steering system is performed.

At the end of this step 7, a return to the standby state at point 4 of the flow chart is made.

In particular, this return to the standby state may occur as soon as the driver has exerted a force in the opposite direction on the steering wheel to straighten the vehicle wheels again.

In this situation, the power steering is deactivated.

If the driver continues his force, the control apparatus must be reactivated. A return to step 2 is made, and if the rotational speed of the steering wheel does not exceed the threshold A, the power steering is not activated.

If this condition is exceeded, the power steering is activated and a return to the preceding situation is made, but the rotation of the steerable wheels is in the opposite direction.

Contrarily, if the driver ceases to exert any action on the steering wheel, the speed of steering wheel rotation undergoes a decrease greater than a predetermined value, and the power steering system is deactivated.

If in another situation the condition for putting the power steering mode into operation is not verified, a pilot control phase without power assistance is entered. In one embodiment, the condition for implementation has priority over the conditions of activation or deactivation. As a result, once the condition for putting it into operation is no longer verified, the power steering system is no longer in operation. In another embodiment, the condition for putting the system into operation is not tested unless the system was previously deactivated.

This strategy has been successfully applied to other situations besides that, described above, of parking.

Figure 2:
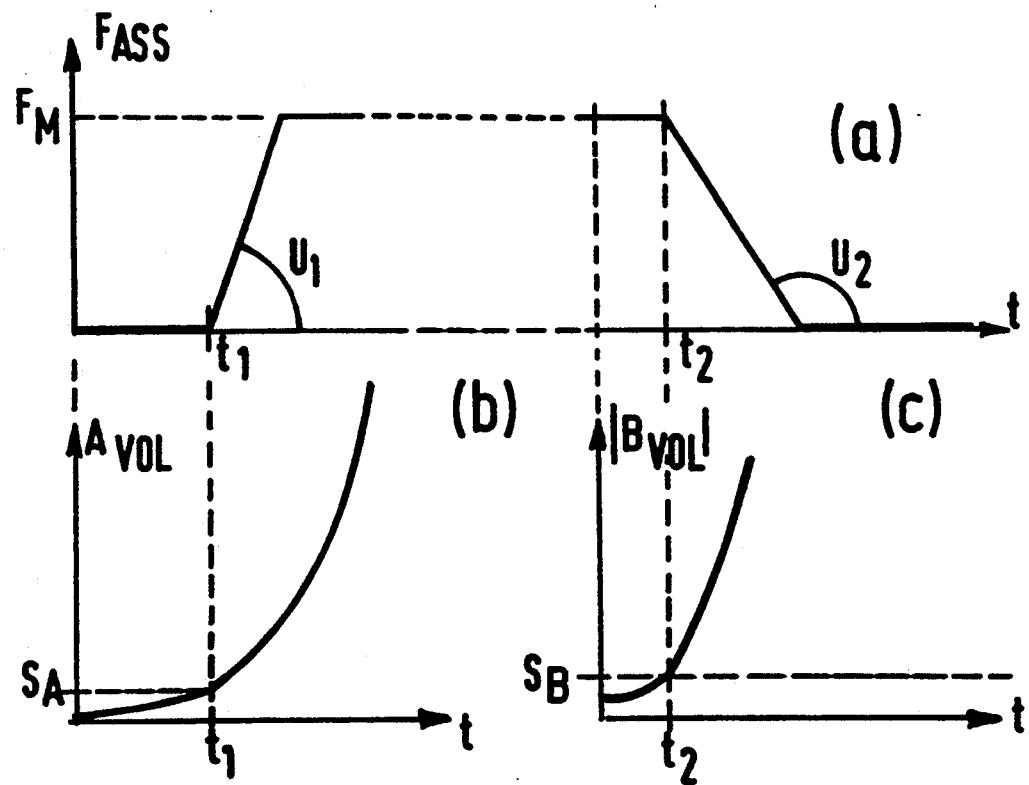
FIG. 2: three timing diagrams of one embodiment of power steering using the strategy of FIG. 1.

In FIG. 2, the function of the power steering, pilot controlled by the strategy of FIG. 1, is shown. The curve of FIG. 2a is a timing diagram of the driving power of the motor furnishing the power steering force Fass.

The power steering system provided in a preferred embodiment of the invention is a system that furnishes a mechanical assisting energy in accordance with two ascending and descending inclined assistance curves U1, U2 and one constant assistance level.

The assistance force mass is plotted on the ordinate over the course of time plotted on the abscissa.

In the curve of FIG. 2a, the power steering system is activated at time $t_1$.

The curve of FIG. 2b plots on the ordinate the rotational speed $A_{vol}$ of the steering wheel and the threshold $S_A$ for activation of the power steering system.

Thus the system is activated along an inclined curve of slope U1 until the maximum value $F_M$ of the assisting torque has been attained.

The rotational speed of the steering wheel varies as a function of the effort exerted by the driver. At the end of a certain period of time, in the curve of FIG. 2c, in which the ordinates show the speed of variation of the rotational speed of the steering wheel, or $B_{vol}$, it can be seen that this acceleration in the rotational angle exceeds a threshold $S_B$.

As a result, the power steering system is deactivated by the execution of a decreasing inclined curve of slope U2 on the driving power Fn until cessation of the assistance at the end of a predetermined period of time.

The inclined activation and deactivation curves U1 and U2 are produced in accordance with prerecorded principles. In one embodiment, these inclined curves are obtained by the instantaneous monitoring of the torque of the electric motor of the power steering system. The strategy is also applied in both directions of rotation of the steering wheel; the power steering system in one case or the other reverses the direction in which the assisting torque is applied.

Figure 3:
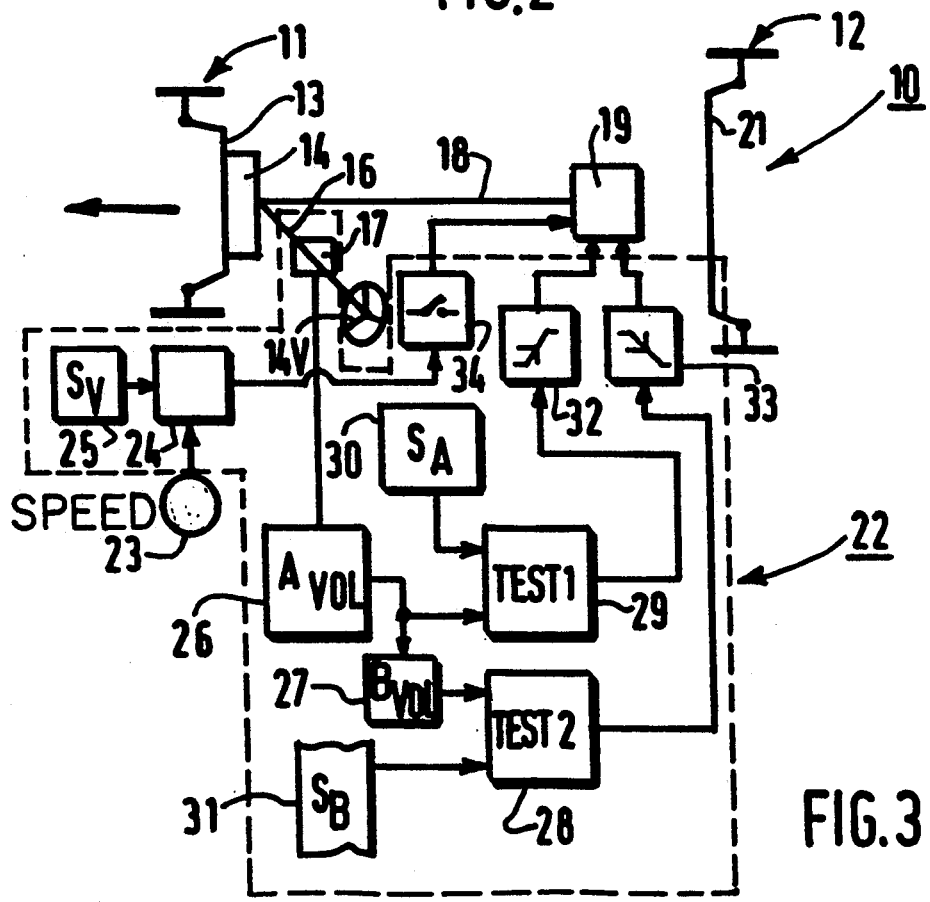
FIG. 3: the general diagram of a vehicle equipped with a system in an embodiment of the present system.

In FIG. 3, a motor vehicle 10 has been shown, provided with a control apparatus 22 in accordance with a preferred embodiment of the invention.

The vehicle 10 includes one set of steerable front wheels 11 and one set of driving rear wheels 12.

The steerable front wheels 11 are joined to the steering column 16 by a steering rod 13 and a rack 14.

The steering column 16 may be turned by the action of a steering wheel 14V manipulated by the driver.

The control apparatus 22 also includes a pickup 17 for the rotational angle of the steering wheel, known as the steering wheel angle. This pickup is mounted on the steering column 16. Since this pickup measures only the rotational speed of the steering wheel, an incremental pickup provided with a detector of the rotational direction suffices for the invention.

It should be noted that the pickup of the activation parameters is as simple as possible. This characteristic of the invention should be compared to the embodiments of the prior art, which require using a steering wheel torque pickup. Torque pickups of this kind are expensive and require that the steering column be made in two separate parts or two parts joined by a calibrated torsion shaft.

The movement of the steering column 16 triggers the power steering under the conditions of the invention, a power steering motor being engaged on a shaft 18 connected to the rack or to the steering column.

The rotation of the shaft 18 is furnished by the power steering system 19, which includes an activation input and a deactivation input.

A system of this kind, as is known in the prior art, primarily includes a motor intended for furnishing the control force F. In a preferred embodiment of the invention, it includes:

- a means 34 which receives the signal for putting the system into operation and puts the power steering system 19 into operation, this means 34 being comprised by a clutch, pilot controlled by the control signals of the invention, that is, by the activation and deactivation inputs of the power steering system;
- a generator with inclined curves U1, U2 including an ascending inclined curve generator 32 and a descending inclined curve generator 33, which excite the motor of the system 19 in accordance with the principles U1 and U2.

The system 22 also includes a pickup 23 for the vehicle speed, which serves as a means for determining whether a condition of putting the control apparatus into operation is met.

The signal original in the pickup is furnished to the first input of a means 24 for executing a test, such as a comparator, a second input of which receives a control value furnished by a reference circuit 25 intended to release at its output a signal for putting the control apparatus into operation. In a preferred embodiment, this signal for putting the system into operation is transmitted to a control input of the means 34. Because such a testing means is provided, the mechanism for engagement and disengagement of the power steering system puts the power steering motor into engagement with a gear mechanism, or any other means for coupling to the output shaft of the power steering system. Because this kind of clutch means is provided, the inertia of the power steering system does not impede the driver when the control apparatus is not in operation. In fact, the power steering motor is then disengaged, and its inertia is not added to the other loads on the steering column 16.

On the other hand, the control system 22 includes a means 26 for calculating the speed of the steering wheel angle, one input of which receives the output signal of the pickup 17.

The output of the calculating means 26 is furnished both to a first test means 29 and to a means 27 for calculating acceleration of the steering wheel angle.

The test means 29 is activated only after the power steering system has been put into operation, so that it furnishes assistance only if all the means of the invention are functional. If not, the vehicle remains in a mode without power-assisted steering.

The output of the test means 29 is furnished to the activation input of the power steering system 19.

At another input, the test means 29 receives a threshold value SA generated by a means 30.

When the test is positive, the system 19 is activated by the output signal 32 of the test means 29.

On the other hand, the means 27 for calculating the acceleration of the steering wheel angle furnishes an output which is transmitted to the first input of a second test means 28, a second input of which receives a threshold value SB. When the second test means 28 furnishes a positive response, because the instantaneous value $B_{VOL}$ for acceleration of the steering wheel angle is exceeding the threshold, the deactivation input 33 of the system 19 receives a control requiring that the inclined curve for deactivating the power steering system be executed. The threshold SB is generated by a means 31. Such a means may be embodied by a reference voltage generator, if the test means is an analog comparator, or by an address of a memory loaded with a constant representing the threshold, if the test means is constituted by a microprocessor.

From this it can be seen that the control apparatus according to the invention makes it possible, in accordance with one or more suitably selected principles of assistance, recorded in the power steering system 20, to perform selective power assistance of the vehicle steering by the system 19.

In a preferred embodiment, the calculation means comprises a pulse counter, one input of which receives a pulsed signal at a first frequency, which makes it possible to count the number of elementary instants between two incremental signals processed by the angle pickup 17. The counting value is recorded in a memory address upon reception of each pulse from the pickup 17. The memorized value is a measure of the instantaneous speed of rotation of the steering wheel. Moreover, variations in this value during predetermined periods of time are indicative of the acceleration of the steering wheel angle.

Figure 4:
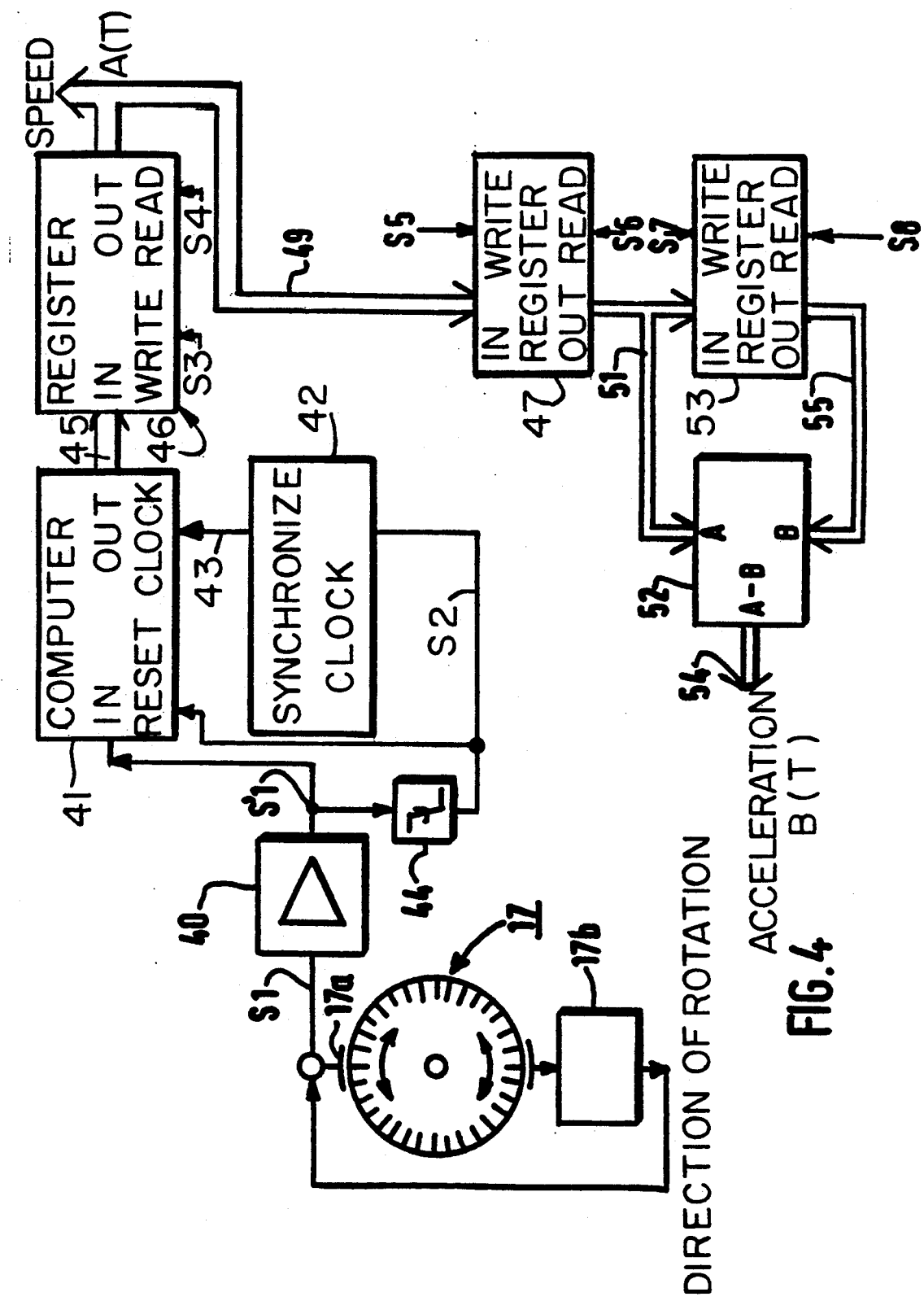
FIG. 4: a diagram of one of the means of the apparatus of FIG. 3.

In FIG. 4, a preferred embodiment of an apparatus intended for generating the activation and deactivation parameters, $A_{VOL}$ and $B_{VOL}$, respectively, is shown.

In FIG. 4, the steering wheel angle pickup 17 for instance comprises a disk of one piece with the steering column 16, which has a first means 17a intended for generating pulses the position of which in time is an indication of the speed of rotation of the steering column. The pickup 17 also includes a second means 17b intended to generate a signal representing the direction of rotation.

The detection means connected to the pickup 17, which include an incremental encoder, output a first signal S1 containing the information on the rotational direction of the steering wheel and comprising a train of pulses which are created each time a notch made in the disk of the pickup 17 moves past a light source. It is understood that the invention is not limited to an incremental pickup of the optical type, but may apply in particular to magnetic or other types of pickups. The signal S1 is transmitted to the input of a circuit 40 intended to shape it, and the output S'1 of which is in the form of a pulse train comprising square pulses represented on the timing diagram in FIG. 5 on the first line S1.

The time interval separating the leading edges of two square pulses is designated by the succession of periods or times Ti−1, Ti, Ti+1.

These periods Ti−1, Ti, Ti+1 are not necessarily constant, but their duration depends on the rotational speed of the steering wheel. As a result, the measurement of each of these durations is a measure of the rotational speed of the steering wheel angle.

The apparatus of FIG. 4 includes a means for simple processing of the signal measuring the activation parameter comprising the steering wheel angle speed. On the other hand, the apparatus of FIG. 4 also includes a means intended to make a measurement of the deactivation parameter, comprising the variation in speed of the steering wheel angle, or in other words its acceleration.

In FIG. 4, the signal S'1 comprising the square pulses is furnished on the one hand to the input of a first circuit 42 and to the input of a second circuit 41. The circuit 41 comprises a trailing edge detector, which outputs a pulse of predetermined duration at its output as soon as it receives a trailing edge of a signal applied to its input.

The circuit 41 is a pulse counter, the input IN of which receives the square signals S'1. When the signal S'1 or S1 reaches the level 1, the counter, beginning at an initial value, begins to count the number of clock pulses 43 received at its clock input Clk activated by the output of a clock 42. The clock 42 is a clock that functions at a frequency markedly higher than the maximum frequency of the signal S1. The ratio in frequency between these two signals makes it possible to estimate the resolution of the chain of measure. The initial counting value is defined by the re-initialization (reset) input of the counter 41, which is connected to the output of the circuit 44 for detecting the trailing edge 52. As a result, the counting starts at the beginning of each period Ti−1, Ti, Ti+1, when the signal S1 is at the level 0.

On the other hand, the output signal S2 of the trailing edge detection circuit 44 is furnished to a synchronizing input of a clock 42. One can now turn to FIG. 5, at the beginning of the period marked Ti.

The output of the counter 41 furnishes a digital word 45, the value of which during counting is incremented by one unit per pulse 60, 61 of the clock 42. This value is furnished to the input IN of a register 46. The register 46 includes a writing control input WR, which receives the signal S3 intended to transfer the contents of the digital word furnished to the input IN to the interior of the register.

On the other hand, at another reading control input, marked Read, the register 46 receives a signal S4 intended for validating reading of the word recorded in the register 46 at the output, marked OUT. When the signal S3 reaches the level "0", the counting value is memorized in the register 46. When the signal S4 reaches the level "0", the contents memorized in the register 46, the value of which represents the speed of the steering wheel angle A(Ti+1) at the time of the preceding analysis period Ti−1 is transmitted to its output 49 for use by the circuit of the invention as has been shown in FIG. 3.

In the embodiment of FIG. 4, the circuit also includes a means for generating the deactivation parameter for the power steering system.

The output 49 of the register 46 is also furnished to the input IN of a register 47 that is identical to the register 46. The data present on the input line 49 is recorded when a signal S5 furnished to a control circuit WR reaches the level "0".

The register makes it possible, in a pipeline type of structure, to memorize the datum A(Ti−1) representing the speed at the time of the previous period for the signal S1.

Furthermore, the circuit of the invention also includes a circuit 53, which is a register analogous to the register 46 and 47. The register 53 includes an input IN connected directly to the output OUT of the register 47. A signal S7 is also furnished to the control input WR of the register 53 as a function of a control signal S6 furnished to the control input READ of the register 47. The control signal S6 makes it possible, in a first step in each period, to transmit the contents of the register 47 over a line 51 the value of the speed at the time of the preceding period to a first input, marked A, of a subtractor 52. The output OUT of the register 53 is also connected, by a line 55, to the input B of the subtractor 52. The register 53 still contains the value of the speed measured during the next-to-last period $Ti-2$ of the signal S1. Reading of the OUT signals of the registers 47 and 53 is read simultaneously at the time of a first phase of the signal S6 and a phase of the signal S8.

The subtractor 52 finds the difference between the contents of the register 47 and 53 and at its output furnishes a digital word 54 representing the value of the acceleration B(t), that is, the variation in the speed of rotation of the steering wheel angle, or in other words the preferred embodiment of the deactivation parameter of the invention.

Figure 5:
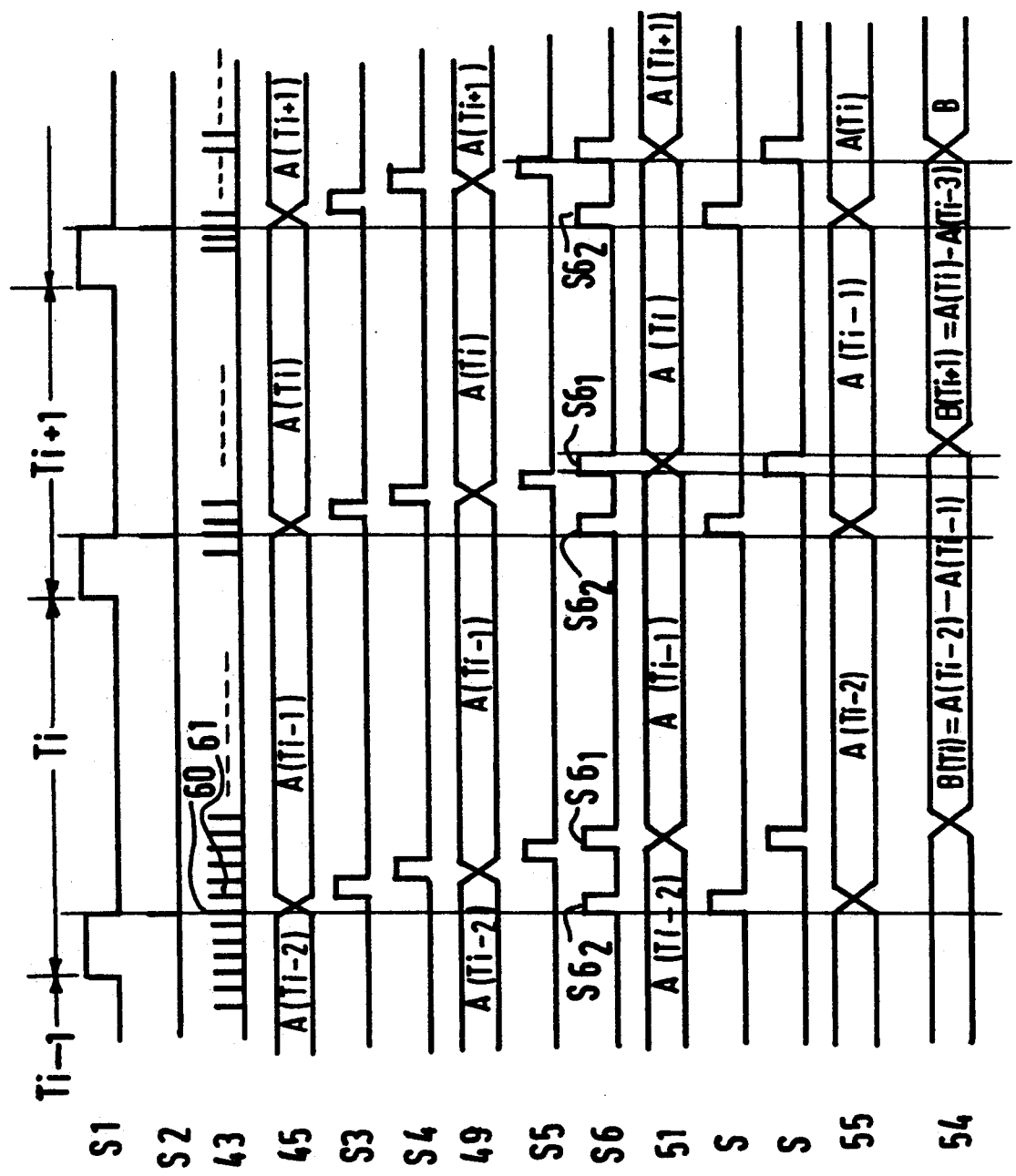
FIG. 5: a timing diagram of the function of the means of FIG. 4.

In FIG. 5, a functional timing diagram of the various signals of the circuit of FIG. 4 is shown. In particular, the square signal S1, S'1, the signal S2 for detecting the trailing edge of the signal S1, and the pulses 43 of the clock signal 42 are shown. It is noted that because of the synchronizing input of the circuit 42, each pulse of the signal S2 corresponds to one pulse 60 of the clock 42. This arrangement makes it possible to reset the clock 42 as a function of the incremental encoder used.

Also shown, at reference numeral 45, is the value of the output OUT of the counter 41 and the contents of the registers 46, 47 and 53. During each period or duration marked $Ti-1$, Ti, $Ti+1$, the digital word 45, which represents $A(Ti-1)$ at the time of the period Ti of S1 cannot be transferred to the register 46 except during the time interval that separates the first synchronized pulse 60 from the first counting pulse 61 on the line 43. To this end, the signal S3 occurs during this interval, and the datum present on the line 45 is transferred to the memory 46.

The output of the register 46 is a digital word 49, which since it is constant can be used over a major portion of each period between the square pulses of the signal S1.

The register 47 is then activated by the reading and writing signals S6 and S5, respectively. The writing signal S5 is tripped at the active level as soon as the datum on the line 49 is fixed.

The reading signal S6 includes two phases $S6_2$ and $S6_1$. The phase $S6_1$ of the signal S6 makes it possible to perform the subtraction operation on the line 54. Since the phase $S6_2$ is simultaneous with the phase S7, it enables the transfer of the contents of the register 47 to the register 53.

The signals S3 through S8 are generated by a microsequencer activated by the signal S2.

In another embodiment, the apparatus of FIG. 4 principally comprises a microprocessor, provided with a READ/WRITE memory zone and with a program that reproduces the signals and functions described above. In a general manner, the three registers 46, 47 and 53 in fact comprise three memory addresses of a read/write memory, while the counter 41 and the subtractor 52 are constituted with the aid of the microprocessor activated by some suitable program, recorded in a fixed memory.

In another embodiment, not shown in the drawings, the control apparatus of the invention also includes a means for detecting the proximity of directional stops of the steerable wheels. It is in fact desirable for the inclined deactivation curve of the power steering motor to be tripped at least a little before the arrival at the directional stop. To this end, the pickup 17 also includes a noise detector, which outputs a deactivation signal.

It should be noted that according to the invention, the acceleration B(T) of the steering angle is taken into account only in order to terminate the power steering phase; hence B(T) is in fact an indirect measurement of the torque. It can thus be seen that the invention makes it possible to benefit from the direct and permanent measurement of the torque exerted on the steering column, while maintaining the advantages that the knowledge of such a measurement affords.

I claim:

1. A control apparatus for a power steering system for a vehicle, wherein the control can be activated or deactivated by at least one control signal, wherein the apparatus includes:

means (17) for measuring rotational speed of the power steering system;

first means (26) receiving the measured rotational speed and for calculating at least one parameter for activation of the power steering system (18);

second means (27) connect to said calculating means for calculating at least one parameter for deactivation of the power steering system;

means (29), connected to said first calculating means, for performing a first test to detect whether at least one activation parameter meets an activation condition;

means (32), connected to said first performing means, for activating the power steering (19) in response to the first test;

means (28), connected to said second calculating means, for performing a second test to detect whether at least one deactivation parameter meets a deactivation condition; and means (33), connected to said second performing means, for deactivation of the power steering (19) in response to the second test.

2. The apparatus of claim 1, wherein the apparatus includes means (23-25) to determine whether a condition for putting the control apparatus into operation is attained, such that the vehicle speed, for instance, is less than a predetermined value.

3. The apparatus of claim 2, wherein the means for putting into operation include a comparator (24), a first input receiving a signal indicating the speed of the vehicle (10) measured by the vehicle pickup (23), a second input receives a signal from a reference circuit (25), and the output, which is active if the first input has a lower value than the second input, is connected to means (34) for at least engagement disengagement of the power steering motor (19).

4. The apparatus of claim 1, wherein the means for measuring at least one activation parameter and said rotational speed of the power steering system includes a pickup (17) of the angle of the steering wheel solidly attached to the steering column.

5. The apparatus of claim 4, wherein the activation parameter comprises the angular speed of the steering wheel angle ($A_{VOL}$).

6. The apparatus of claim 5, wherein the apparatus includes means (26) for generating at each instant (Ti), a value (Avol) representing the speed of the steering wheel angle ($A_{VOL}$) which includes a counter (41), the output of which represents the number of pulses of a clock (42) separating two successive pulses generated by an incremental encoder on the inside of the pickup (17).

7. The apparatus of claim 6, wherein the apparatus further includes a digital memory, an address of which, during a period of time separating two pulses of the signal (S1) originating in the pickup (17), memorizes the instantaneous digital value of the activation parameter (Avol) furnished by the counter (41).

8. The apparatus of claim 7, wherein the apparatus further includes a memory address (47) loaded with the former value of the address (46) memorizing the activation parameter, the means (52) for generating the deactivation parameter also including a second address (53) memorizing the value of the activation parameter during a prior period, the outputs of the registers (47 and 53) being furnished to the subtraction inputs of a subtractor (52), the output (54) of which represents the instantaneous value of the deactivation parameter.

9. The apparatus of claim 8, wherein the test means include a first comparator between the activation parameter and an activation threshold, and a second comparator between the deactivation parameter and a second deactivation threshold.

10. The apparatus of claim 9, wherein the steering wheel angle pickup (17) also includes means for detecting the proximity of a directional rotation stop, the activation signal of this means generating a deactivation signal transmitted to the inclined deactivation curve generator (U2).

11. The apparatus of claim 4, wherein the deactivation parameter comprises the variation of the speed of the steering wheel angle ($B_{VOL}$), that is, its acceleration.

12. The apparatus of claim 4, wherein the power steering system includes at least one motor, the motive power of which may be controlled by an inclined curve generator of increasing driving power (U1) and decreasing driving power (U2).

13. The apparatus of claim 12, wherein the means for testing the activation condition generates a control signal furnished to the ascending inclined curve generator (U1) of the power steering system, and that the means for testing the deactivation condition generates a control signal furnished to the descending inclined curve generator (U2) of the power steering system.

14. The apparatus of claim 4, wherein the power steering system includes at least one motor, and means for generating decreasing driving power to control said at least one motor.

15. The apparatus of claim 1 comprising a microprocessor provided with an input/output unit, a read-write memory for memorizing the activation and deactivation parameters in successive periods (Ti), and a fixed memory with a prerecorded program.

* * * * *